(12) United States Patent
Drossler et al.

(10) Patent No.: US 6,631,921 B1
(45) Date of Patent: Oct. 14, 2003

(54) AIR-BAG ARRANGEMENT

(75) Inventors: Norbert Drossler, München (DE); Alois Juchem, Transvaal (ZA)

(73) Assignee: Autoliv Development AB, Vårgårda (SE)

( * ) Notice: Subject to any disclaimer, the term of this patent is extended or adjusted under 35 U.S.C. 154(b) by 0 days.

(21) Appl. No.: 09/868,323

(22) PCT Filed: Dec. 17, 1999

(86) PCT No.: PCT/SE99/02427

§ 371 (c)(1),
(2), (4) Date: Aug. 29, 2001

(87) PCT Pub. No.: WO00/37287

PCT Pub. Date: Jun. 29, 2000

(30) Foreign Application Priority Data

Dec. 18, 1998  (GB) .............................................. 9828008

(51) Int. Cl.$^7$ .............................................. B60R 21/22
(52) U.S. Cl. .................................. 280/730.2; 280/743.2
(58) Field of Search ........................... 280/730.2, 743.2, 280/743.1, 742

(56) References Cited

U.S. PATENT DOCUMENTS

| 5,586,782 | A |   | 12/1996 | Zimmerman, II et al. |
|---|---|---|---|---|
| 6,010,149 | A | * | 1/2000 | Riedel et al. ............. 280/730.2 |
| 6,168,191 | B1 | * | 1/2001 | Webber et al. ........... 280/730.2 |
| 6,176,513 | B1 | * | 1/2001 | Neidert ...................... 280/729 |
| 6,176,514 | B1 | * | 1/2001 | Einsiedel ................. 280/730.2 |
| 6,189,918 | B1 | * | 2/2001 | Stavermann ............. 280/730.2 |
| 6,213,499 | B1 | * | 4/2001 | Khoudari et al. ........ 280/730.2 |
| 6,260,878 | B1 | * | 7/2001 | Tanase ..................... 280/730.2 |
| 6,290,253 | B1 | * | 9/2001 | Tietze et al. ............. 280/730.2 |
| 6,296,272 | B1 | * | 10/2001 | Heigl ....................... 280/730.2 |
| 6,312,009 | B1 | * | 11/2001 | Håland et al. .............. 280/729 |
| 6,394,487 | B1 | * | 5/2002 | Heudorfer et al. .......... 280/729 |
| 6,398,253 | B1 | * | 6/2002 | Heigl ......................... 280/729 |
| 6,435,543 | B1 | * | 8/2002 | Magoteaux et al. ..... 280/730.2 |
| 6,451,715 | B2 | * | 9/2002 | Li et al. ....................... 442/76 |
| 6,457,742 | B1 | * | 10/2002 | Brucker ................... 280/730.2 |
| 6,471,240 | B2 | * | 10/2002 | Bakhsh et al. .............. 280/729 |
| 6,481,743 | B1 | * | 11/2002 | Tobe et al. ............... 280/728.2 |

FOREIGN PATENT DOCUMENTS

| DE | 196 39 617 | 4/1998 |
|---|---|---|
| DE | 197 57 374 | 6/1999 |
| GB | 296 05 896 | 9/1996 |
| GB | 2 324 068 | 10/1998 |
| WO | WO 94/19215 | 9/1994 |
| WO | WO 96/26087 | 8/1996 |
| WO | WO 98/19894 | 5/1998 |

* cited by examiner

Primary Examiner—Paul N. Dickson
Assistant Examiner—Deanna Draper
(74) Attorney, Agent, or Firm—Venable LLP; Robert Kinberg

(57) ABSTRACT

An airbag arrangement in a motor vehicle, the air bag arrangement comprising an inflatable element including fabric and a gas generator component adapted to inflate the inflatable element in response to the sensing of predetermined conditions. The inflatable element is initially stored in a non-linear recess, channel or housing provided in the motor vehicle extending above a door opening of the motor vehicle. The inflatable element includes an upper edge provided with anchoring means connected to points within the recess, channel or housing, the inflatable element having a first chamber adjacent to the upper edge thereof adapted to be inflated, and also having a second discrete chamber adjacent to a lower edge thereof. The second chamber is of elongate form and associated with anchoring means to anchor opposite ends of the second chamber to fixed points in the motor vehicle. The second chamber is configured so that the length of the lower edge of the inflatable element is reduced on inflation of the second chamber to tension the lower edge of the inflatable element. The fabric defining the first chamber is of greater porosity than the fabric forming the second chamber.

15 Claims, 4 Drawing Sheets

AIR-BAG ARRANGEMENT

BACKGROUND OF THE INVENTION

THE PRESENT INVENTION relates to an air-bag arrangement, and more particularly relates to an air-bag arrangement intended for use in a motor vehicle such as a motor car.

It has been proposed to provide an air-bag arrangement which incorporates an inflatable element which is associated with a gas generator adapted to inflate the inflatable element in the event that an accident should occur. The inflatable element, when inflated, forms a substantially flat structure which is located between the occupant of the vehicle and adjacent the side of the vehicle, thus covering the door or windows provided at the side of the vehicle. The flat structure may be termed a "side curtain". The inflatable element may initially be located, in the uninflated state, in a housing or recess formed in the roof of the vehicle extending, across the top of the door opening.

An inflatable element of this type may be of substantial benefit in a side impact situation, or in a roll-over situation, and consequently the gas generator may be adapted to inflate the inflatable element in response to a sensor adapted to sense such a side impact, or roll-over situation.

The inflatable element, when inflated, provides protection for the head and shoulder of the driver against all impact with the structure forming the side of the vehicle. Thus, the inflatable element may prevent the head of the occupant striking part of the vehicle which might injure the occupant, such as the "B"-Post, if the occupant is a front seat occupant, or striking the "C"-Post if the occupant is a rear seat occupant. The inflatable element also serves to prevent the occupant of the vehicle being partially or completely thrown out of the vehicle through the window opening.

SUMMARY OF THE INVENTION

The present invention seeks to provide an improved air-bag arrangement of the type generally discussed above.

According to this invention there is provided an air-bag arrangement in a motor vehicle, the air-bag arrangement comprising an inflatable element formed of fabric and gas generator means adapted to inflate the inflatable element in response to the sensing of predetermined conditions, the inflatable element being initially stored in a non-linear recess, channel or housing provided in the motor vehicle extending above the door opening of the motor vehicle, the inflatable element having an upper edge provided with anchoring means connected to points within the recess, channel or housing, the inflatable element having a first chamber adjacent the upper edge thereof adapted to be inflated, and also having a second discrete chamber adjacent the lower edge thereof, said second chamber being of elongate form and being associated with anchoring means to anchor opposite ends of the second chamber to fixed points in the motor vehicle, the second chamber being configured so that the length of the lower edge of the inflatable element is reduced on inflation of the second chamber to tension the lower edge of the inflatable element, the fabric defining the first chamber being of greater porosity than the fabric forming the second chamber.

Conveniently the first chamber is adapted, on inflation, to remain inflated for a period of at least one second.

Advantageously the second chamber is adapted, on inflation, to remain inflated for a period of at least three seconds.

Preferably the portion of the inflatable element defining the first chamber is only loosely connected to the portion of the inflatable element defining the second chamber.

Conveniently the region of the inflatable element connecting the first chamber and the second chamber is formed from warp threads and weft threads that are not inter-woven.

In an alternative arrangement the region of the inflatable element inter-connecting the first chamber and the second chamber is fabricated solely from warp (or weft) threads, the weft (or warp) threads and any coating applied thereto having been cut-away.

Conveniently the gas generator means comprises a first gas generator associated with the first chamber and a second gas generator associated with the second chamber.

In an alternative embodiment the gas generator means comprises a single gas generator connected to the first chamber and the second chamber, the gas generator being connected to the second chamber by means of a non-return valve.

Conveniently the gas generator means are associated with sensor means adapted to sense the side impact, the gas generator means being actuated in response to a sensed side impact.

Advantageously the second chamber comprises a plurality of cells, each configured to have a substantially cylindrical form on inflation, the axis of each cell extending generally transversely of the axis of the chamber, the axis of each cell thus intersecting the lower edge of the inflatable element.

Conveniently the first chamber has a first region comprising a plurality of cells, and a second region comprising at least one cell, the regions being interconnected by a gas duct, the first region and the second region being separated by an uninflatable region of the inflatable element.

Advantageously the inflatable element is fabricated using a one-piece weaving technique.

Preferably the fabric forming the inflatable element is coated, there being less coating applied to the fabric defining the first chamber, than is applied to the fabric defining the second chamber.

In one embodiment the fabric forming the first chamber of the inflatable element is fabricated using fewer threads than the fabric forming the second chamber.

BRIEF DESCRIPTION OF THE DRAWINGS

In order that the invention may be more readily understood, and so that further features thereof may be appreciated, the invention will now be described, by way of example, with reference to the accompanying drawings in which.

DETAILED DESCRIPTION OF THE INVENTION

Figure 1:
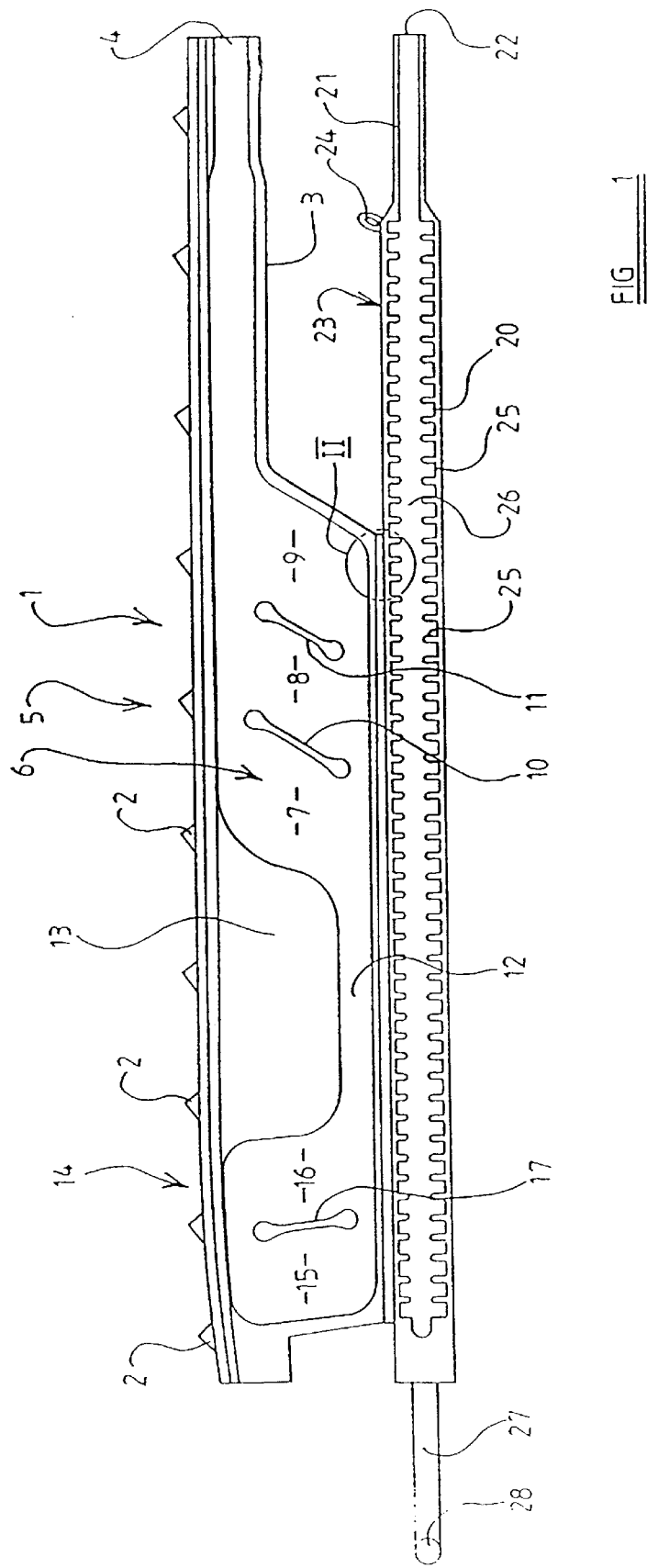
FIG. 1 is a plan view of an inflatable element for use in an embodiment of the invention.

Referring initially to FIG. 1 of the accompanying drawings, an inflatable element is provided which is intended to be mounted in a motor vehicle in a position such that, when the inflatable element is inflated, the inflatable element forms a "side curtain" located between an occupant of the vehicle and the side part of the motor vehicle. The inflatable element 1, as shown in FIG. 1, is formed from two superimposed layers of fabric. The warp and weft threads of the superimposed layers of fabric are inter-woven at selected areas, using a technique which is known as "one-piece weaving", so as to form seams inter-connecting the upper and lower layers of fabric. The fabric is provided with an exterior coating to enhance the imperviousness of the fabric.

The inflatable element 1 is provided, along the upper edge thereof, with a plurality of anchor tabs 2. The right-hand side of the upper region of the inflatable element, as shown, is the form of a gas supply conduit or duct 3, which has an open end 4 adapted to be connected to a gas generator. The duct 3 leads, from the open end 4, to a central region 5 of the inflatable element which is provided with a first discrete inflatable chamber 6. The chamber 6 comprises three substantially vertical cells 7,8,9 which are separated by partition seams 10,11. The partition seams 10,11 extend at an inclined angle to the vertical.

The gas supply duct 3 communicates with the upper end of each cell 7,8,9. The lower ends of the cells 7,8,9 communicate with a further gas duct 12 which extends, adjacent the lower edge of the inflatable element, beneath a region 13 where the front layer of fabric and the rear layer of fabric are inter-connected so that the region 13 does not inflate.

The gas supply duct 12 extends towards a further region 14 of the inflatable element which is located adjacent the left-hand edge of the inflatable element, as illustrated, where two further cells 15,16 are provided separated by a partition seam 17.

It is to be understood that when gas is supplied through the open end 4 of the gas supply duct 3, the cells 7, 8 and 9 will inflate, and gas will also flow through the gas supply duct 12 to inflate the cells 13 and 14. Thus the entire chamber 6, which is constituted by the combination of the cells 7, 8 and 9, the gas supply duct 12 and the cells 13 and 14, will be inflated.

Substantially the entire lower edge of the inflatable element is constituted by a second discrete chamber 20 of elongate form, one end of which communicates with a gas supply duct 21, the gas supply duct 21 having an open end 22 adapted to be connected to a gas generator. The elongate chamber 20 has a terminal extended region 23 which extends freely from a position beneath the cells 7, 8 and 9 towards the open end 22 of the gas supply duct 21. An anchor tab 24 is provided at the end of the region 23 remote from the rest of the inflatable element.

The remaining part of the elongate chamber 20 is effectively connected to the lower edge of supply duct 12 which extends beneath the cells 7,8,9 and also beneath cells 15 and 16.

The interior of the chamber 20 is divided into a plurality of adjacent cells by means of transversely extending partition seams 25. The partition seams 25 do not extend in an un-broken form across the entire width of the chamber 20, but instead define apertures 26 which provide a gas communication between adjacent cells.

The chamber 20 is provided, at the end remote from the gas supply duct 21, with a strap 27 which extends to an anchor tab 28.

It is to be appreciated that when gas is supplied, through the open end of the gas supply duct 21, the gas will enter the chamber 20 and inflate the cells defined between the transversely extending partition walls 25. As the cells inflate they assume a substantially cylindrical form. The axis of each inflated cell extends generally transversely of the axis of the chamber 20, thus intersecting the line of the lower edge of the inflatable element. Consequently, inflation of the cells leads to a shortening of the length of the lower chamber 20, and a shortening of the length of the lower edge of the inflatable element.

It is to be appreciated that as both of the chambers 6 and 20 of the inflatable element inflate, so the fabric defining the cells 7,8,9, and the cells 15,16, and also the cells within the chamber 20, will become distorted, and will no longer be "flat", but instead will have a curvaceous form. To facilitate this distortion of the fabric, in the region where the lower edge of the gas duct 12 which extends beneath the first chamber 6 is connected to the upper edge of the chamber 20, the fabric layers are formulated in a specific manner.

Figure 2:
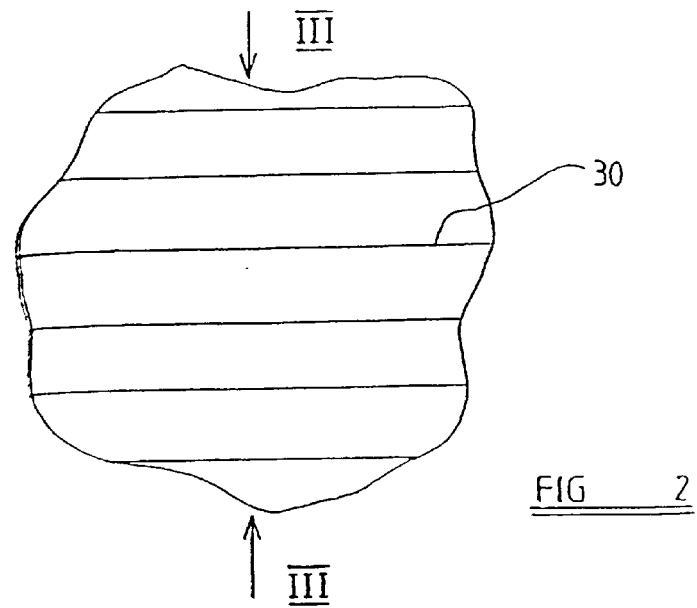
FIG. 2 is an enlarged view of part of the inflatable element shown in FIG. 1.
Figure 3:
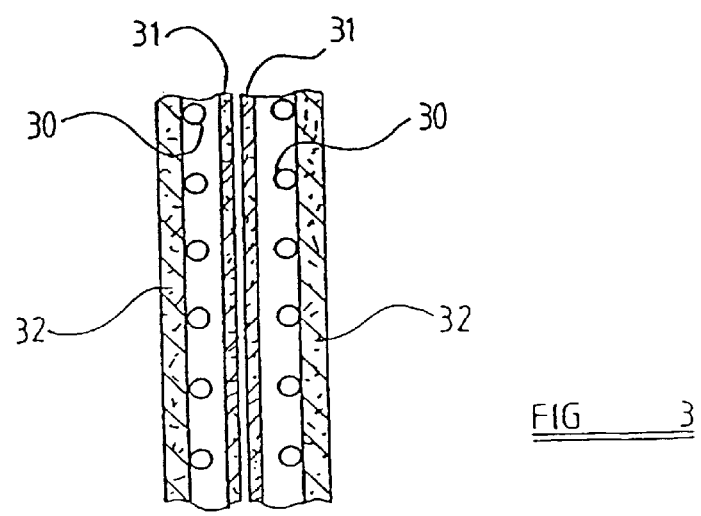
FIG. 3 is a sectional view taken on the line III—III of FIG. 2.

Referring now to FIG. 2, which illustrates schematically the area identified by ring 11 in FIG. 1, it is to be appreciated that the warp threads 30, of each of the two adjacent layers of fabric which extend in the longitudinal direction of the inflatable element, are located on the outside of the respective layer of fabric, and the weft threads 31, which extend vertically, are located on the interior of the respective layer of fabric. The warp and weft threads are not inter-woven in this region, but merely lie adjacent each other.

The warp threads 30 are provided with an exterior coating 32.

Figure 4:
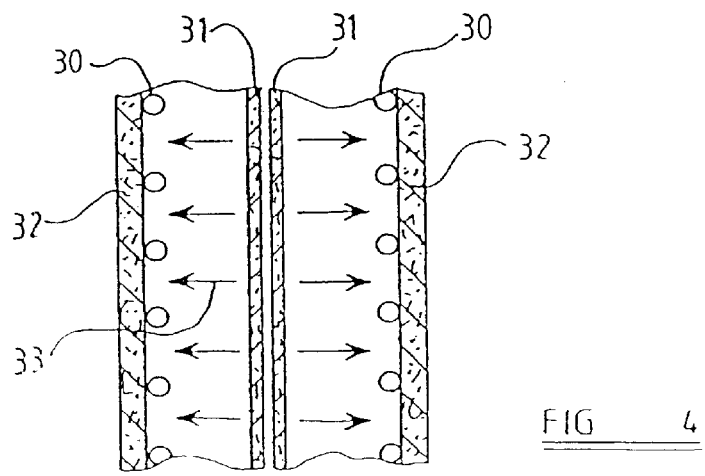
FIG. 4 is a view corresponding to FIG. 3 illustrating the inflatable element when in the inflated state.

As can be seen, from FIG. 4, the warp threads 30, together with the associated coating 32, are capable of moving outwardly away front the weft threads 31, as indicated generally by the arrows 33. As will be described in more detail below, this provides a "loose" connection between the upper part 5 of the inflatable element, which defines the first chamber 6, and the lower part of the inflatable element which defines the second chamber 20.

In the described embodiment, part of the inflatable element defining the gas supply duct 3, and the first chamber 6, is made of a fabric which has a relatively high permeability. On the other hand, the part of the inflatable element defining the gas supply duct 21 and the second discrete chamber 20 is made of fabric having a very low permeability. The permeability of the fabric may be determined by the nature of the weaving, and by the nature of a coating applied to the exterior of the fabric. Thus less coating may be applied to the part of the inflatable element defining the first chamber 6, minimising production costs. Alternatively, the fabric forming the first chamber 6 may be made with fewer threads, or threads of reduced quality, compared with those used for the rest of the inflatable element, thus again minimising production costs while also minimising the weight of the inflatable element, and the volume of the inflatable element when it is in an initial un-inflated folded state.

The inflatable element, as described above, is intended to be mounted in position above the door opening of a motor vehicle.

Figure 5:
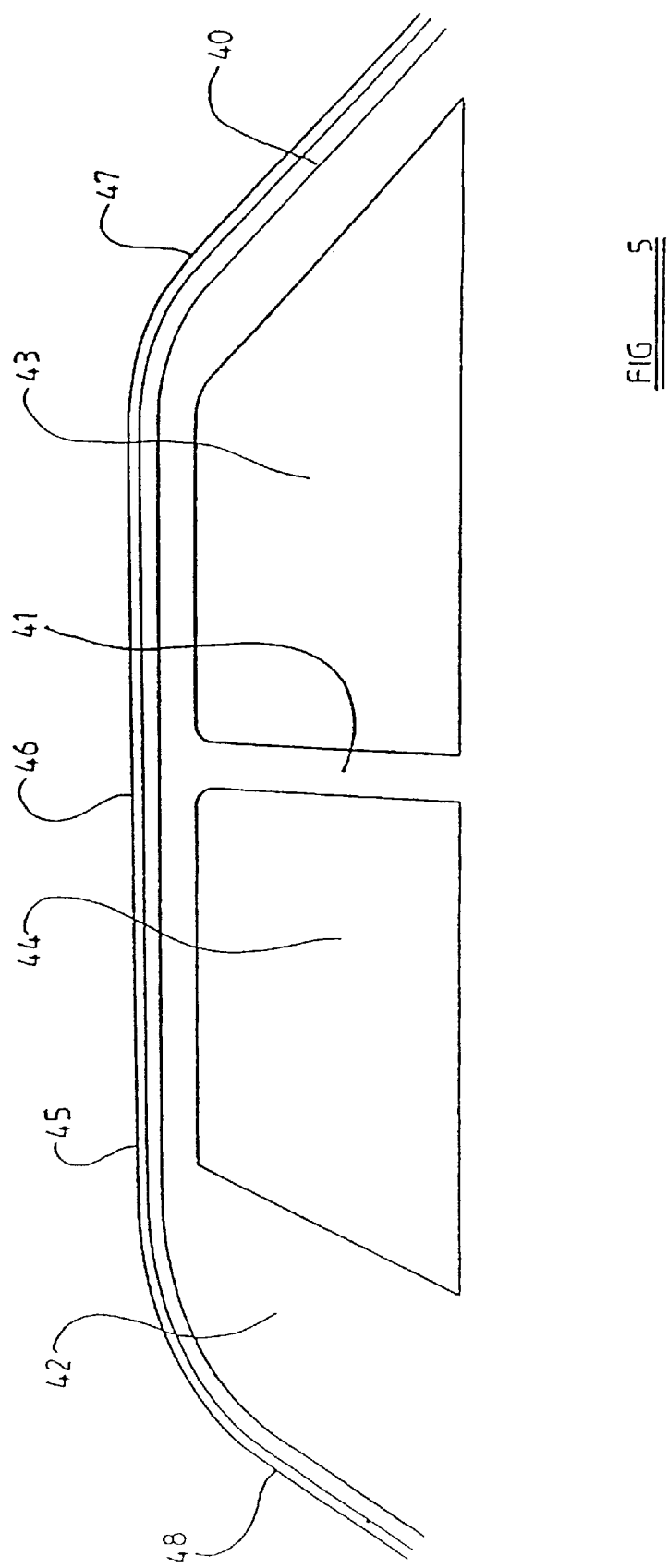
FIG. 5 is a diagrammatic view of the side portion of a motor vehicle, such as a motor car, illustrating a housing containing in the inflatable element when in the uninflated form.
Figure 6:
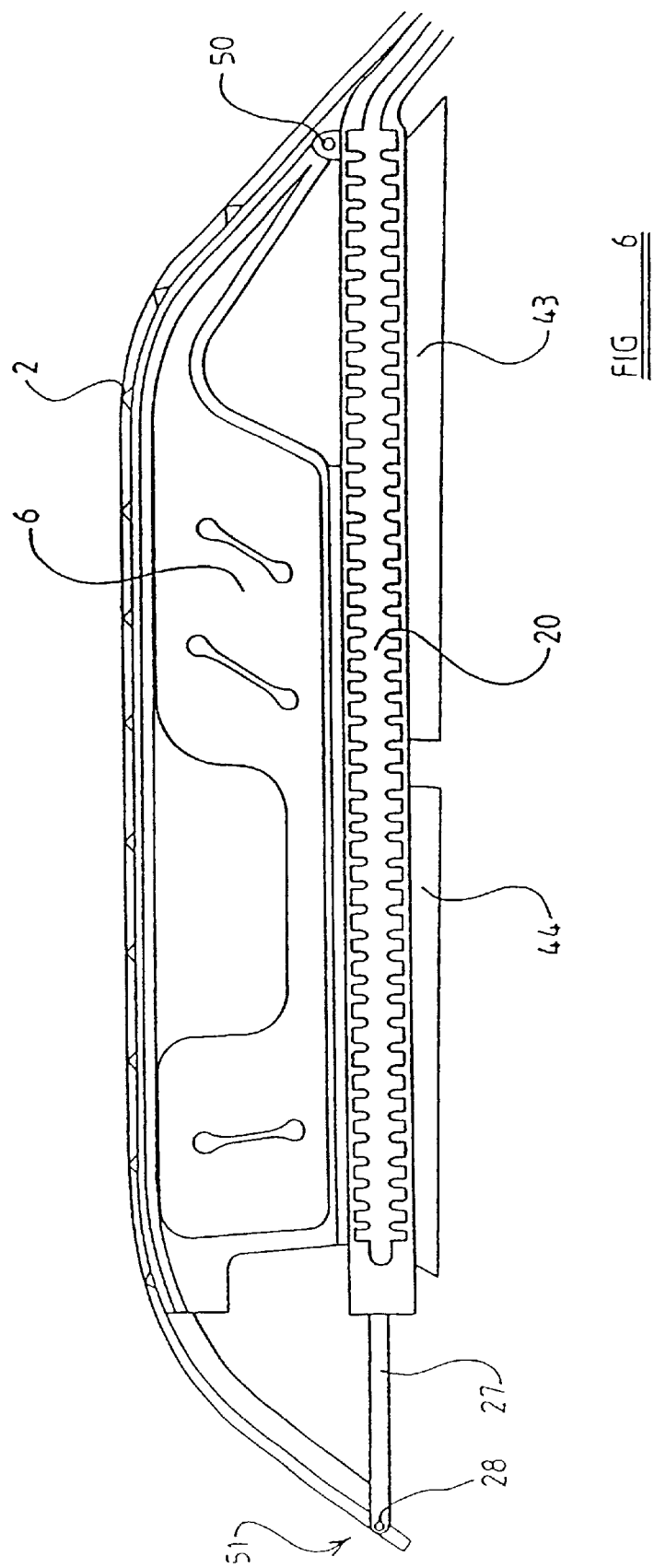
FIG. 6 is a view corresponding to FIG. 5, but illustrating the inflatable element in the inflated form.

Referring now to FIG. 5, part of the interior of a motor vehicle is shown schematically. The part illustrated comprises an "A"-Post 40, a "B"-Post 41 and a "C"-Post 42. The window 43 of a front door of the vehicle is illustrated and the window 44 of a rear door of the vehicle is also illustrated.

Mounted in the roof of the motor vehicle is a non-linear elongate recess, channel or housing 45, having a substantially linear region 46 extending above the windows 43 and 44, which communicates with non-aligned regions 47, lying, adjacent the "A"-Post 40 and 48 lying adjacent the "C"-Post 42. Thus the recess, channel or housing 45 is of non-linear form.

The inflatable element 1, as shown in FIG. 1, is initially folded and stored within the non-linear recess, channel or housing 45, with the anchor tabs 2 provided at the upper edge of the inflatable element being secured to tab 24 provided on the region 23 of the chamber 20 is connected to an appropriate anchor point on the A-Post 40, and the anchor tab 28 provided on the strap 27 is also connected to an appropriate anchor point on the C-Post 42.

The open end 4 of the gas supply duct 3 is connected to a first gas generator, and the open end 22 of the gas supply duct 21 is connected to a second gas generator although, alternatively, both gas ducts could be connected to a single gas generator with a non-return valve being provided within the gas duct 21. Thus the two chambers 6 and 20 are discrete in that the chambers are not in direct gas communication and the chamber 20 may contain gas at a higher pressure than the gas within the first chamber 6.

In the event that a sensor associated with the gas generator or each gas generator senses conditions indicative of a side impact or a roll-over situation, gas is supplied to the inflatable element.

It can be seen that the upper edge of the inflatable element, which incorporates the gas supply duct 3, is connected, by means of the anchor tabs 2, to a non-linear part of the recess, channel, or housing 44. One end of the second chamber 20 is connected by means of the anchor tab 24 to an anchor point 50 located on the "A"-Post of the motor vehicle, and the anchor tab 28 on the strap 27 is connected to all anchor point 51 provided on the "C"-Post of the motor vehicle.

The second chamber 20 and the strap 27, when the inflatable element is in the uninflated form, have a sufficient length to enable the strap 27 and the part of the inflatable element defining the chamber 20 to be located within the non-linear recess channel or housing 45. However, on inflation of the inflatable element, the individual cells defined within the second chamber 20, by the transverse partition walls 25, become inflated. Each cell thus becomes of a substantially vertical cylindrical form, and thus the fabric that forms each cell bulges out of the substantially vertical plane accommodating the inflated element. This effectively shortens the length of the part of the inflatable element defining the lower chamber 20 to such an extent that when the inflatable element is inflated, the lower edge of the inflatable element is held substantially taut, with the strap 27 and part of the inflatable element defining the second chamber 20 extending substantially tightly between the anchoring points 50 and 51. The fabric forming the second chamber 20 has a relatively low permeability, and thus when this chamber 20 has been inflated it remains inflated for a relatively long period of time, typically up to five seconds, although a period of three seconds may prove to be sufficient. This chamber 20 acts to keep the lower edge of the inflatable element taut. Thus, since the upper edge of the inflatable element is connected, by the anchor tabs 2, to the non-linear recess, channel or housing 45, the inflated chamber 20 will maintain the inflatable element in position as a curtain providing protection to the occupant of the vehicle in a roll-over situation, even if the first chamber 6 is deflating or deflated. The inflatable element will thus prevent an occupant of the vehicle being completely or partially ejected from the vehicle through either of the windows 43 or 44.

On inflation of the inflatable element, gas is also supplied to the first chamber 6. The first chamber 6 becomes inflated to provide protection for the occupant of the vehicle, preventing the occupant of the vehicle impacting with parts of the vehicle adjacent the inflated chamber. Thus, the inflated cells 7,8,9 are located, for example, to prevent the head of the driver of the vehicle from impacting with the "B"-Post 41, and the cells 15 and 16 are located to prevent the head of an occupant of the rear seat of the vehicle from impacting with the "C"-Post 42. Also, the inflated cells will provide some protection for the occupant of the vehicle if anything intrudes, from outside the vehicle, into the interior of the vehicle.

The fabric forming the first chamber 6 is made to be of a relatively high permeability so that, if the occupant of the vehicle impacts with the cells of the first chamber 6 when they are inflated, the cells will yield and provide a soft cushioning effect. Thus the risk of the occupant rebounding from the inflatable element is reduced.

The protection provided by these inflatable cells is only really required during a very brief period following initiation of a side impact, or roll-over accident. Consequently, it is not disadvantageous if this part of the inflatable element deflates relatively swiftly. Thus this first chamber 6 may be adapted to remain inflated for a period of approximately one second.

It is to be appreciated that the inflated area 13 is provided in a position where it is extremely unlikely that protection will be required for an occupant of the vehicle. By having this part of the inflatable element designed so that it cannot be inflated, the quantity of gas that is required to inflate the first chamber 6 is minimised, thus enabling the chamber 6 to be inflated relatively swiftly.

It is to be understood that as the inflatable element inflates, so the fabric forming the cells 7,8,9, 15 and 16 will become distorted, since these cells take on a substantially cylindrical configuration on inflation of the inflatable element, and the fabric forming the second chamber 20 will also be distorted. The distortions of the fabric do not damage the region between the lower edge of the gas supply duct 12 and the upper edge of the chamber 20, as illustrated in FIGS. 9 to 4 since, as described above, the connection between the upper part of the inflatable element, and the lower part defining the chamber 20 is "loose". Thus permits parts of the chamber 20 to move, relative to the upper part 5 of the inflatable element, enabling the length of the lower chamber 20 to be reduced, thus tensioning the lower edge of the inflatable element. In the region between the lower edge of the gas supply duct 12 and the upper edge of the chamber 20, the warp and weft threads of the fabric are not interconnected, enabling the distortion of the adjacent regions of fabric to be accommodated.

In one embodiment of the invention it is envisaged that in this region of the inflatable element, the warp threads 30 could be cut and removed, for example after the entire inflatable element had been provided with the coating 30, so that in this region the warp threads 30 and the coating 32 would no longer be present. This action would leave only the weft threads 31 in this region of the inflatable element. It is to be appreciated that if this expedient is adopted, the warp threads would initially be present during the application of the coating that is conventionally applied to the exterior of an inflatable element of the type generally described, and would thus prevent the weft threads from being provided with the coating material. On subsequent removal of the selected warp threads 30 and the associated coating 32, the remaining weft threads 31 would not be coated, and would thus be free to move to accommodate any distortions of the fabric forming the adjacent regions of the inflatable element.

It is to be appreciated that many modifications may be effected to the embodiment of the invention described above. For example, the design of the gas supply ducts 3 and 12 which are associated with the fist first chamber 6, may be of a different configuration. The seams 10, 11 and 17 may be vertical or even inclined in the opposite sense.

Also, whilst a specific form of "loose" connection between the first upper chamber 6 and the second lower chamber 20 has been described, other types of connection may be used, such as a loosely woven piece of fabric or even discrete straps.

Whilst, as described, it is preferred to use a one-piece-weaving technique to fabricate an embodiment of the invention, conventional stitching techniques could also be used.

What is claimed is:

1. An airbag arrangement in a motor vehicle, the air bag arrangement comprising an inflatable element including fabric and a gas generator means adapted to inflate the inflatable element in response to the sensing of predetermined conditions, the inflatable element being initially stored in a non-linear recess, channel or housing provided in the motor vehicle extending above a door opening of the motor vehicle, the inflatable element having an upper edge provided with anchoring means connected to points within the recess, channel or housing, the inflatable element having a first chamber adjacent to the upper edge thereof adapted to be inflated, and also having a second discrete chamber adjacent to a lower edge thereof, said second chamber being of elongate form and being associated with anchoring means to anchor opposite ends of the second chamber to fixed points in the motor vehicle, the second chamber being configured so that the length of the lower edge of the inflatable element is reduced on inflation of the second chamber to tension the lower edge of the inflatable element, the fabric defining the first chamber being of greater porosity than the fabric forming the second chamber.

2. An arrangement according to claim 1, wherein the fabric forming the first chamber of the inflatable element is fabricated using fewer threads than the fabric forming the second chamber.

3. An arrangement according to claim 2 wherein the fabric forming the inflatable element is coated, there being less coating applied to the fabric defining the first chamber, than is applied to the fabric defining the second chamber.

4. An air-bag arrangement according to claim 1, wherein the first chamber is adapted, on inflation, to remain inflated for a period of at least one second.

5. An arrangement according to claim 1 wherein the second chamber is adapted, on inflation, to remain inflated for a period of at least three seconds.

6. An air-bag arrangement according to claim 1, wherein a portion of the inflatable element defining the first chamber is only loosely connected to a portion of the inflatable element defining the second chamber.

7. An air bag arrangement according to claim 6 wherein a region of the inflatable element connecting the first and the second chamber is formed from warp threads and weft threads that are not inter-woven.

8. An air bag arrangement according to claim 6 wherein a region of the inflatable element interconnecting the first chamber and the second chamber is fabricated solely from warp threads, the weft threads and any coating applied thereto having been cut away.

9. An air bag arrangement according to claim 6 wherein a region of the inflatable element interconnecting the first chamber and the second chamber is fabricated solely from weft threads, the warp threads and any coating applied thereto having been cut away.

10. An air-bag arrangement according to claim 1 wherein the gas generator means comprises a first gas generator associated with the first chamber and a second gas generator associated with the second chamber.

11. An air-bag arrangement according to claim 1 wherein the gas generator means comprises a single gas generator connected to the first chamber and the second chamber, the gas generator being connected to the second chamber by means of a non-return valve.

12. An air-bag arrangement according to claim 1 wherein the gas generator means are associated with sensor means adapted to sense a side impact, the gas generator means being actuated in response to a sensed side impact.

13. An air-bag arrangement according to claim 1 wherein the second chamber comprises a plurality of cells, each configured to have a substantially cylindrical form on inflation, the axis of each cell extending generally transversely of the axis of the chamber, the axis of each cell thus intersecting the lower edge of the inflatable element.

14. An arrangement according to claim 13 wherein the first chamber has a first region comprising a plurality of cells, and a second region comprising at least one cell, the regions being interconnected by a gas duct, the first region and the second region being separated by an uninflatable region of the inflatable element.

15. An arrangement according to claim 1 in which the inflatable element is fabricated using a one-piece weaving technique.

* * * * *